United States Patent
Kralik et al.

[11] Patent Number: 5,988,736
[45] Date of Patent: Nov. 23, 1999

[54] MOTOR VEHICLE ROOF WITH A SEQUENCE OF SLIDING LOUVERS

[75] Inventors: Martin Kralik, Weilheim; Wolfgang Seifert, Beilngries, both of Germany

[73] Assignee: Webasto Karosseriesysteme GmbH, Stockdorf, Germany

[21] Appl. No.: 08/912,618

[22] Filed: Aug. 18, 1997

[30] Foreign Application Priority Data

Aug. 24, 1996 [DE] Germany .......................... 196 34 325

[51] Int. Cl.⁶ .................................................. B60J 7/047
[52] U.S. Cl. ................................. 296/216.06; 296/220.01
[58] Field of Search ..................... 296/216.06–216.08, 296/216.09, 218, 219, 220.01; 49/495.1

[56] References Cited

U.S. PATENT DOCUMENTS

| | | | |
|---|---|---|---|
| 3,972,558 | 8/1976 | Horn | 296/216.06 |
| 4,474,405 | 10/1984 | Kloppe et al. | 296/220.01 |
| 5,335,961 | 8/1994 | Reinsch et al. | 296/213 |
| 5,372,401 | 12/1994 | Odoi et al. | 296/216.06 |
| 5,421,635 | 6/1995 | Reinsch et al. | 296/223 X |

FOREIGN PATENT DOCUMENTS

| | | | |
|---|---|---|---|
| 1068032 | 6/1954 | France | 49/495.1 |
| 2 516 871 | 5/1983 | France . | |
| 932384 | 8/1955 | Germany | 49/495.1 |
| 31 43 346 C2 | 5/1983 | Germany . | |
| 2 259 284 | 3/1993 | United Kingdom . | |

OTHER PUBLICATIONS

Japanese Patent Abstract No. 07285343, Oct. 31, 1995, Toyota Motor Corp.

*Primary Examiner*—Dennis H. Pedder
*Attorney, Agent, or Firm*—Sixbey, Friedman, Leedom & Ferguson; David S. Safran

[57] ABSTRACT

A motor vehicle roof with a series of sliding louvers for selectively closing or at least partially exposing a roof opening in a fixed roof surface, in which the louvers abut one another in the closed position and form a flat interconnected louver assembly that is guided along guides such that, when the louvers are displaced in the longitudinal direction of the vehicle, the louver assembly executes translational movement which causes the assembly to be separate on a louver by louver basis by pivoting each individual louver forward in an opening direction, and to be re-established when the roof is closed. Each louver (10a–10e) in the closed position is sealed on each side of the roof opening by a hollow chamber seal (30) that has a sealing surface (36) which is engaged by the louver side edges (37). To reduce seal friction and for improved tolerance compensation, the sealing surface (36), faces upwardly the top of the roof at an angle relative to the louvers (10a–10e) and is inclined in a downward direction toward a longitudinal center of the roof opening. Furthermore, the side edge (37) of the louvers, in the closed position, engage the sealing surface (36) roughly in its center.

20 Claims, 3 Drawing Sheets

& # 1

MOTOR VEHICLE ROOF WITH A
SEQUENCE OF SLIDING LOUVERS

BACKGROUND OF THE INVENTION

1. Field of the Invention

The invention relates to a motor vehicle roof with a series of sliding louvers for selectively closing or at least partially exposing a roof opening in fixed roof surface, the louvers abutting one another in the closed position and forming a flat interlocked louver assembly which is guided along guides such that, when the louvers are slid in the longitudinal direction of the vehicle, the flat interlocked louver assembly executes a translational movement which causes the louvers of the assembly to be separated one-by-one via a upward swivelling of the individual louvers in an opening direction, or which causes the separated louvers to be re-assembled by swivelling downward of the louvers as the roof is closed, each louver in the closed position, on either side of roof opening, being sealed by means of a hollow chamber sealing element which seals by a sealing surface engaging a louver side edge.

2. Description of Related Art

A motor vehicle roof of the type to which the invention is directed is known, for example, from U.S. Pat. No. 5,335, 961. As in a conventional sliding and lifting roof, in this known motor vehicle roof, the sliding louvers are sealed laterally relative to the roof opening. The hollow chamber sealing elements used for this purpose project laterally from the roof opening edge toward the louvers and abut the blunt louver side edge over a large area. While this sealing arrangement ensures the required sealing function, the relatively high seal friction is problematic when using a louver material with greater thermal expansion, for example, aluminum or plastic. In particular, when using a large number of movable louvers, as a result of the large friction surfaces between the sealing elements and the sliding louvers, strong drive forces are necessary. Due to the necessary compensation for play transversely relative to the longitudinal center of the roof opening, between the louver drive mechanism and louvers, there is furthermore the danger of twisting of the louver system due to the greatly limited louver motion transversely to the longitudinal center of the roof opening.

Comparable problems arise in the lifting motor vehicle roof known from German Patent DE 31 43 346 C2 in which, to seal the glass cover in the roof opening, opposite the bordering roof surface, there is a hollow chamber sealing element which projects towards the top of the roof and is squeezed together by the edge of the closed glass cover, such that it has a cross section in a roughly L shape, surrounding the roof cover edge and also the bottom of the roof cover.

Furthermore, a seal arrangement for a motor vehicle roof with a series of sliding louvers using a hollow chamber sealing element is known from U.S. Pat. No. 5,421,635. In this known motor vehicle roof, the hollow chamber sealing element is clamped in the louver closing position between the bottom of a roof opening groove and a stepped surface on the edge of the louver, the step surface always remaining under the roof edge in any position of the louver. The aforementioned problems do not arise in the same way in this sealing arrangement, since the louvers there do not emerge upwardly from the roof opening.

SUMMARY OF THE INVENTION

A primary object of this invention is to devise a motor vehicle roof of the initially mentioned type which requires only relatively low drive forces for the sliding louvers and which allows problem-free use of a louver material with high thermal expansion.

This object is achieved in accordance with the invention by having the sealing surface point towards the top of the roof and run in the direction to the longitudinal center of roof opening at an inclination relative to the louvers, and that the side edges of the louvers, in the closed position, engage the sealing surface roughly in the center.

While in the aforementioned prior art the sealing element is clamped either horizontally or vertically between the louvers and the roof opening side edge over a large area, the invention takes the new approach of a small-cellular seal contact results from the sloped course of the seal surface and a preferably rounded execution of the engaged louver side edge.

Based on the inclined course of the sealing surface of the hollow chamber sealing element, proceeding inwardly from the roof opening side edge, floating motion of the louvers transversely to the longitudinal center of the roof opening and thermal expansion of the louvers in this direction are not prevented, so that louver material with relatively large thermal expansion, such as, for example, aluminum and plastic, can be easily used without the need for strong drive forces for the louver arrangement. The danger of twisting of the louver system is reliably prevented as a result of the unhindered floating motion and thermal expansion of the louvers.

Especially low seal friction is achieved by the angle of incline of the sealing surface of the hollow chamber sealing element being an acute angle relative to the main surfaces of the louver. This angle is preferably between about 10° and 30°.

The sealing effect is supported by the shape of the sealing wall section being arched outward in the unloaded state, and by the outside of the section forming the sealing surface of the hollow chamber sealing element.

To minimize seal friction, the side wall sections of the hollow chamber sealing element preferably run obliquely such that they elastically counteract loading of the sealing wall section by the side edge of the louvers, i.e., they can accommodate the load without deformation.

To ensure optimum and permanent sealing against the roof surface the hollow chamber sealing element in the joining area between the seal wall section and its side wall section pointing outwardly towards the side edge of the roof opening is provided with another sealing surface which engages the roof opening side edge or groove like a seal.

According to another advantageous feature of the invention, the hollow chamber sealing element is provided with a tolerance compensation lip which fits under the side roof opening groove and which is preferably located on the connecting area between the seal wall section and the side wall section of the hollow chamber sealing element, i.e., the section on the roof opening groove side.

Advantageously, the hollow chamber sealing element, with the wall section which is opposite the seal wall section, is securely joined to the roof structure. In this way, optimum deformability of the hollow chamber sealing element is ensured in favor of a permanent seal relative to the louver.

According to another advantageous aspect of the invention, it is provided that the louver side edge, in the engagement area with the seal wall section, is made rounded, preferably in a droplet shape. This also contributes to minimization of the friction between the seal and louver.

The droplet shape is preferably the size of the safety radius necessary in the edge area and this enables economical louver production.

Finally, the hollow chamber sealing element made according to the invention allows a reduction of the optical seal gap compared to the prior art.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
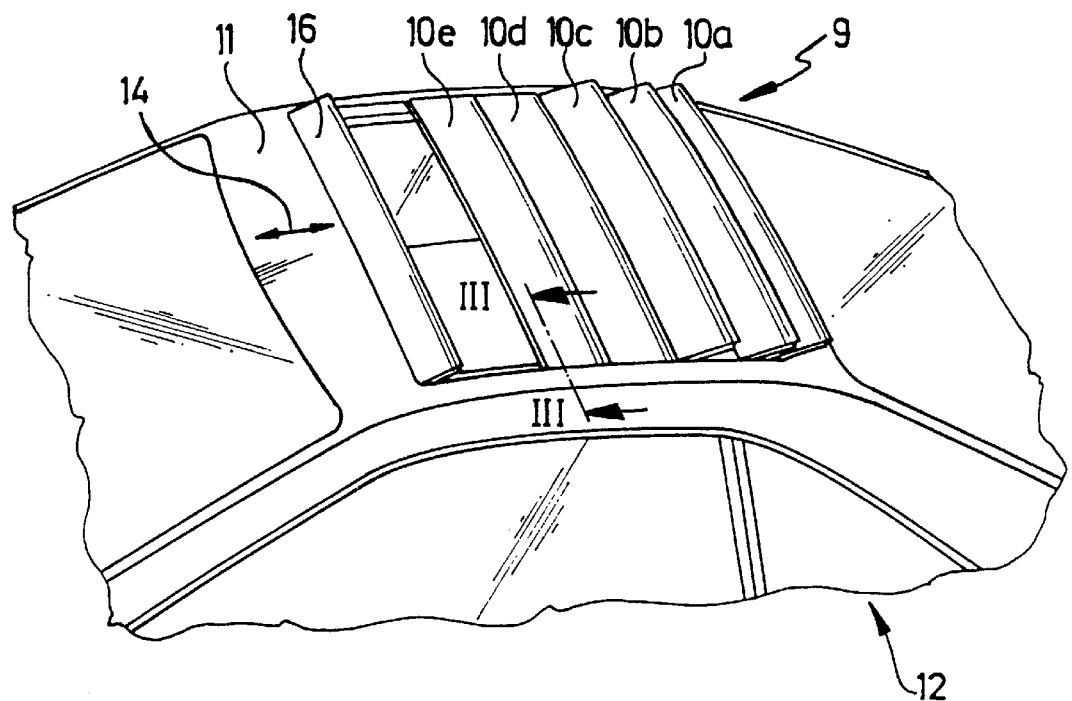
FIG. 1 shows a perspective schematic view of a louvered roof in the partially opened state.
Figure 2:
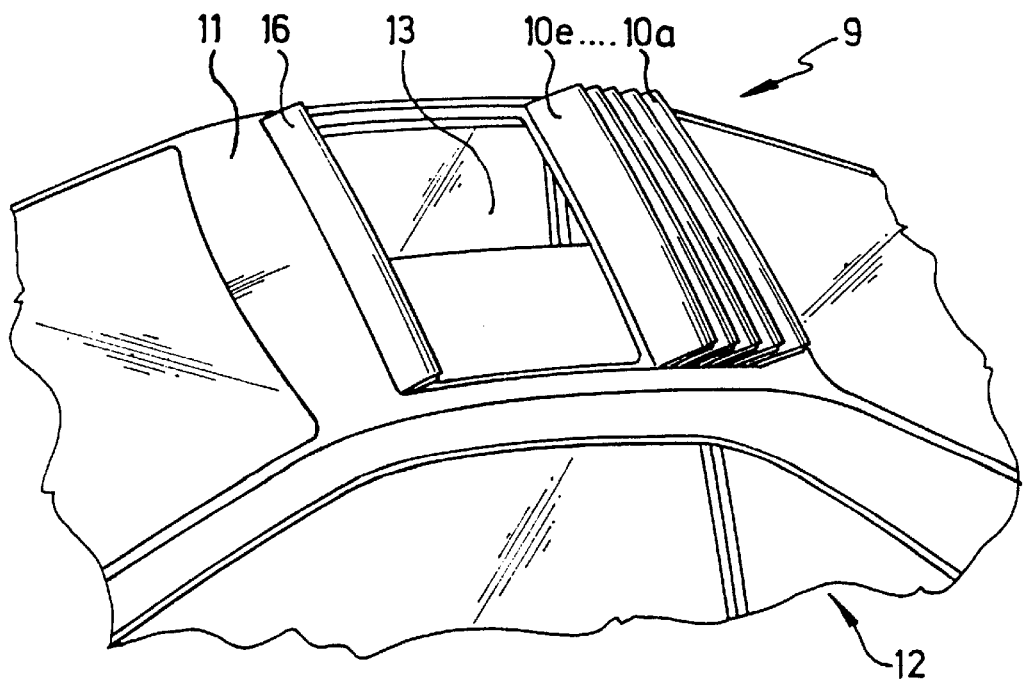
FIG. 2 shows a view according to FIG. 1 with the roof completely opened.

The motor vehicle roof 9, hereafter called a louvered roof, has a series of sliding louvers 10a to 10e, as shown in FIGS. 1 and 2. These louvers are used for selective closing or at least partial exposing of roof opening 13 in fixed roof surface 11 of motor vehicle 12. To open and close roof 9, the louvers 10a to 10e can be moved, in the embodiment shown, in the directions of movement 14 denoted by the double arrow running parallel to the longitudinal axis of the motor vehicle. Basically, however, other directions of motion are also possible, for example, transversely to the longitudinal axis of the motor vehicle. In their closed position, louvers 10a through 10e abut one another to form a seal along their longitudinal edges, which run transversely to direction of motion 14. In doing so, they form a flat interconnected louver assembly, as is shown in FIG. 1 for the two louvers 10d and 10e. Furthermore, the louvers 10a through 10e can each be swung around a pivot axis which extends transversely to the direction of movement 14.

A displacement mechanism (not shown) of known construction, e.g., that of the above-mentioned U.S. Pat. No. 5,335,961, coordinates the sliding and pivoting motions of the individual louvers 10a through 10e such that, when the sliding louvers are displaced, the flat louver assembly executes a translational motion in one of the directions of motion 14. During opening movement, this assembly is separated louver by louver in the area of the end which is forward in the opening direction by moving the louver which is foremost out of the assembly. Similarly, the assembly is reestablished on a louver by louver basis as the roof is closed.

In the course of opening roof 9 from the fully closed position, only louver 10a is first released from the interconnected louver assembly by pivoting this louver upward such that its rear edge is raised above the rear edge of roof opening 13. Louver 10a can then be pushed to the rear, in this inclined position, together with the other louvers 10b through 10e which remain in the flat interconnected louver assembly, i.e., which have not yet been swung out, with louver 10a continuing to pivot into its end position as it moves further rearward. After louver 10a has reached its rear end position, illustrated in FIGS. 1 and 2, the next louver 10b is raised. This interplay is repeated until, as shown in FIG. 2, all of the sliding louvers 10a through 10e have been raised and pushed to the rear into the fully open position. When roof 9 is closed, proceeding from the fully open position shown in FIG. 2, first only louver 10e is moved forward and pivoted back down into a position parallel to fixed roof surface 11. A corresponding motion is induced in succession for following louvers 10d through 10a until all of the louvers are back in flat interconnect assembly in their forward end position closing roof opening 13.

In the illustrated embodiment of motor vehicle roof 9, in the area of the front end of the roof opening 13, is a raisable, louver-shaped wind deflector 16 which is pivotable around a pivot axis which runs transversely to the longitudinal axis of the motor vehicle (directions 14) into a position which rises obliquely to the rear when the opening process is initiated. In the closed position of roof 9, the rear edge wind deflector 16 adjoins the transversely extending, front longitudinal edge of sliding louver 10e, which is in the foremost end position. In doing so, wind deflector closes the foremost part of roof opening 13. However, optionally, the design can also be such that the flat assembly of louvers 10a through 10e extends from the front edge to the rear edge of roof opening 13 in the closed position, and thus, assumes the closing function by itself. In doing so, in the manner conventional for sliding roofs, optionally, there can be a wind deflector which disappears under the solid roof surface when the roof is closed and which automatically passes into a working position when the roof is opened. FIGS. 1 and 2 show a motor vehicle roof with five sliding louvers 10a through 10e. But, it goes without saying that, the number of sliding louvers is essentially variable depending on the given circumstances.

Figure 3:
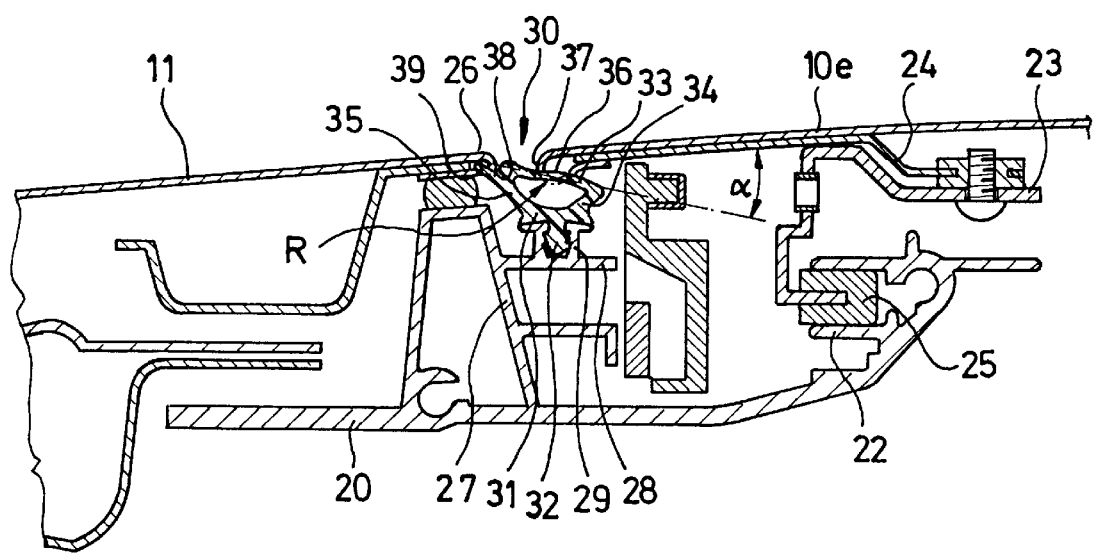
FIG. 3 shows in an enlarged sectional view taken along line III—III of FIG. 1.

As can be determined from FIG. 3, motor vehicle roof 9 has a roof frame 20 which is attached under the fixed roof surface 11 extending around the roof opening 13, and which has a frame opening 21 concentrically positioned within and below the roof opening 13. On each of two opposite lateral sides of the roof frame 20, a guide in the form of a guide rail 22 is supported on roof frame 20 running in the directions of movement 14. The arrangement is mirror-symmetrical with respect to the longitudinal center line of the roof, so that descriptions and explanations for one side of the roof also apply to the other side.

A louver carrier 23 has one end connected via a reinforcing sheet 24 to louver 10e, and has a slide shoe 25 on its other end which is held to slide in guide rail 22. Sliding displacement of the louvers is not in particular the subject of this application, and as noted above, reference can be made to the above-mentioned U.S. Pat. No. 5,335,961 for a suitable louver displacement mechanism.

In the area of roof opening side edge 26 of motor vehicle roof 9, a support part 27 of the roof frame 20 is connected to the underside of the fixed roof via a seal S made of an adhesive material. On a transverse projection 28 of support part 27, a rail 29 is formed which runs in the directions of movement 14 of the louvers and to which a hollow chamber seal element 30 is securely joined. Hollow chamber seal element 30 has a bottom wall 31 which is supported on rail 29 and which contains an anchoring crosspiece 32 which projects downward and which enters into rail 29 and is anchored there. Permanent holding of the anchoring crosspiece 32, and thus of hollow chamber seal element 30 in rail 29, is achieved by the anchoring crosspiece 32 being made with barbs which fit into complementary grooves in the rail 29. The hollow chamber seal element 30, furthermore, has an upper wall section 33 which is joined to bottom wall section 31 via side wall sections 34 and 35, which run obliquely relative to each other toward anchoring crosspiece 32.

Figure 4:
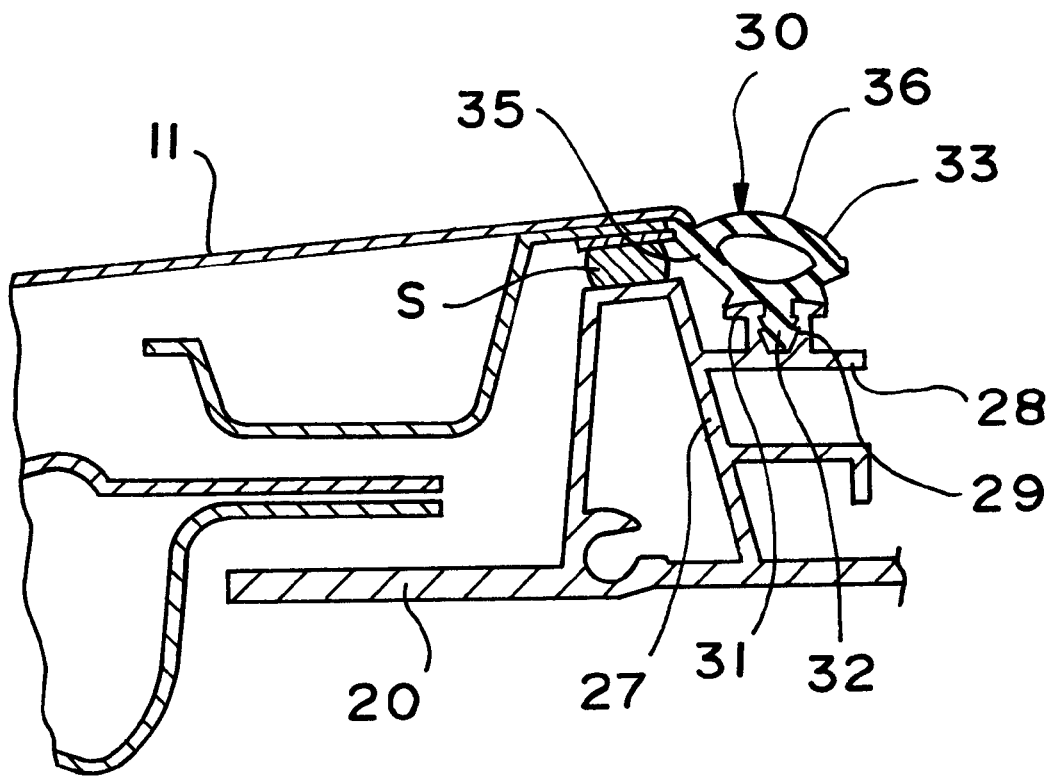
FIG. 4 is view of the fixed roof mounted structure of FIG. 3, showing the hollow chamber seal in its unloaded state.

The outer surface of the upper wall section 33 provides a sealing surface 36 facing toward the roof which is inclined relative to louver 10e in a direction that slopes downward toward the longitudinal center of roof opening 13. A louver side edge 37 engages roughly the center of the sealing surface 36, when the louver 10e is in the closed position shown in FIG. 3. As a result of this seal engagement, the louver side edge 37, mainly with its lower edge, presses upper wall section 33, which is arched outward in the unloaded state (FIG. 4), inward into the cavity of seal element 30, by which sealing surface 36 fits against the contour of louver side edge 37 to form a seal; in this embodiment, the contour of side edge 37 is formed of a folded edge portion that creates a droplet-shaped bulge which interacts with the sealing surface 36 of hollow chamber seal element 30. The angle of inclination α which is included between the sealing surface 36 and the surface of sliding louvers 10a to 10e is made an acute angle of about 10° to 30°.

In the area at which the seal wall section 33 joins the side wall section 35 of hollow chamber seal element 30, i.e., the area near the edge of the fixed roof 11 defining roof opening 13, a concavely arched sealing surface 38 is formed with a shape which corresponds in a roughly complementary manner to the shape of the roof opening side edge or a groove which fits against this sealing surface 38 to form a seal. Seal element 30 also has a tolerance compensation lip 39 which extends upward as an extension of the seal side wall section 35. The Compensation lip 39 projects beyond the sealing surface 38 and reaches the underside of the edge of the fixed roof 11 defining roof opening 13, and ensures that the sealing surface 38 also is always sealed relative to the fixed roof 11 even though the seal wall section 33 is loaded by louver side edge 37.

The droplet shape of louver side edge 37, preferably, has a required safety radius R (for example R=2.5 mm) which is formed peripherally on the louver and which ensures its economical production without presenting an exposed sharp edge.

The location of hollow chamber seal element 30 under louver side edge 37 and the inclined course of the sealing surface 36 of seal wall section 33 allow floating motion and unhindered thermal expansion of louver 10e in the direction transversely relative to the longitudinal center of the roof opening, i.e., transversely relative to the directions of movement 14 of the louvers. In this way, the danger of twisting of the louver system which occurs in the prior art is precluded. Based on the inclined alignment of sealing surface 36 relative to louver side edge 37, it is ensured that for reliable and permanent sealing is achieved. Furthermore, as a result of the small friction surfaces between the hollow chamber seal element 30 and the louvers 10a to 10e, relatively small drive forces are necessary for the louver roof.

Preferably, sealing surface 36 of hollow chamber seal element 30 is dimensioned and arranged such that it is pressed together from about 10% up to a maximum of 50% due to pressure applied thereagainst by louver side edge 37. The hollow chamber seal element is made of an elastomer, such as silicone.

The seal arrangement of the invention is not limited to a louvered sliding roof, rather it is also suitable for advantageous sealing of integral sliding and lifting roofs as well. Thus, while a single embodiment in accordance with the present invention has been shown and described, the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. In a motor vehicle roof of the type having a fixed roof surface in which a roof opening is formed and at least one movable cover member having lateral sides at which the at least one movable cover is guided along guides which run in a longitudinal direction of the roof along each of lateral sides of the roof opening for movement between a closed position and a position at least partially exposing the roof opening and having a hollow chamber seal element having an upper wall with an outer sealing surface which seals against an underside of a side edge at each of said lateral sides of said at least one movable cover member in said closed position; wherein the sealing surface faces upward and is inclined relative to said side edge along substantially said entire upper wall in an area bounding the chamber of the chamber seal in a downward direction toward a longitudinal center of the roof opening when the sealing surface of said seal is sealed against said side edge in said closed position; and wherein said side edge, in the closed position, engages the sealing surface roughly in a center area thereof.

2. Motor vehicle roof as claimed in claim 1, wherein said at least one movable cover member comprises a plurality of cover members in the form of a series of sliding louvers which abut one another in the closed position and form a flat interconnected louver assembly which is guidable along said guides in a manner which causes the assembly to be separated on a louver by louver basis as each louver is pivoted upward when moved in an opening direction and to be re-established as each louver is pivoted downward when the roof is returned to said closed position; wherein each louver, in the closed position, is sealed by said hollow chamber seal element at each side of roof opening via engagement of the sealing surface with lateral side edges of the louvers.

3. Motor vehicle roof as claimed in claim 2, wherein the louvers are strip-shaped having a body forming a cover surface, and wherein, in the closed position, said sealing surface has an angle of inclination relative to the cover surface of the louvers which is an acute angle of between about 10 and 30 degrees.

4. Motor vehicle roof as claimed in claim 2, wherein the upper wall of the hollow chamber seal is arched outwardly in an unloaded state.

5. Motor vehicle roof as claimed in claim 4, wherein the hollow chamber seal has a pair of side wall sections each of which is on an opposite side of said upper wall, said side wall sections extending in the longitudinal direction of the roof and extending obliquely toward one another from said upper wall.

6. Motor vehicle roof as claimed in claim 5, wherein the hollow chamber seal, in a corner area between the upper wall and a one of the side wall sections which is adjacent to an edge of the fixed roof bordering the roof opening, has another sealing surface which seals against said edge of the fixed roof.

7. Motor vehicle roof as claimed in claim 6, wherein the hollow chamber seal has a tolerance compensation lip which engages under said edge of the fixed roof.

8. Motor vehicle roof as claimed in claim 7, wherein said tolerance compensation lip is located between the upper wall and said one of the side wall sections that is adjacent to the edge of the roof bordering the roof opening.

9. Motor vehicle roof as claimed in claim 2, wherein the hollow chamber seal is securely joined to a fixed structure of the roof at a side of the hollow chamber seal that is opposite said upper wall.

10. Motor vehicle roof as claimed in claim 2, wherein the hollow chamber seal element is made of an elastomer.

11. Motor vehicle roof as claimed in claim 10, wherein said elastomer is silicone.

12. Motor vehicle roof as claimed in claim 2, wherein the side edge of the louvers has a rounded shape in an area which engages the sealing surface of the hollow chamber seal.

13. Motor vehicle roof as claimed in claim 12, wherein said rounded shape of the side edge has a radius of about 2.5 mm.

14. Motor vehicle roof as claimed in claim 1, wherein the at least one cover member has a cover surface; and wherein, in the closed position, said sealing surface has an angle of inclination relative to the surface of the at least one cover member which is an acute angle of between about 10 and 30 degrees.

15. Motor vehicle roof as claimed in claim 14, wherein the upper wall of the hollow chamber seal is arched outwardly in an unloaded state.

16. Motor vehicle roof as claimed in claim 15, wherein the hollow chamber seal has a pair of side wall sections each of which is on an opposite side of said upper wall, said side wall sections extending in the longitudinal direction of the roof and extending obliquely toward one another from said upper wall.

17. Motor vehicle roof as claimed in claim 16, wherein the hollow chamber seal, in a corner area between the upper wall and a one of the side wall sections which is adjacent to an edge of the fixed roof bordering the roof opening, has another sealing surface which seals against said edge of the fixed roof.

18. Motor vehicle roof as claimed in claim 17, wherein the sealing surface which seals against said edge of the fixed roof comprises a tolerance compensation lip located between the upper wall and said one of the side wall sections that is adjacent to the edge of the roof bordering the roof opening.

19. Motor vehicle roof as claimed in claim 15, wherein the side edge of the at least one cover member has a rounded shape in an area which engages the sealing surface of the hollow chamber seal.

20. Motor vehicle roof as claimed in claim 19, wherein said rounded shape of the side edge has a radius of about 2.5 mm.

* * * * *